(12) United States Patent
Bouaziz et al.

(10) Patent No.: US 10,493,919 B2
(45) Date of Patent: Dec. 3, 2019

(54) EXTERIOR MIRROR UNIT

(71) Applicant: MCi (Mirror Controls International) Netherlands B.V., Woerden (NL)

(72) Inventors: François Roderik Henri Bouaziz, Woerden (NL); Stefan Fritz Brouwer, Woerden (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 36 days.

(21) Appl. No.: 15/523,539

(22) PCT Filed: Nov. 4, 2015

(86) PCT No.: PCT/NL2015/050769
§ 371 (c)(1),
(2) Date: May 1, 2017

(87) PCT Pub. No.: WO2016/072852
PCT Pub. Date: May 12, 2016

(65) Prior Publication Data
US 2017/0305352 A1    Oct. 26, 2017

(30) Foreign Application Priority Data
Nov. 5, 2014 (NL) ...................................... 2013746

(51) Int. Cl.
*B60R 1/078* (2006.01)
*B60R 1/06* (2006.01)

(52) U.S. Cl.
CPC ................ *B60R 1/078* (2013.01); *B60R 1/06* (2013.01)

(58) Field of Classification Search
None
See application file for complete search history.

(56) References Cited

U.S. PATENT DOCUMENTS

| | | | | |
|---|---|---|---|---|
| 5,355,255 A | * | 10/1994 | Assinder | .................. B60R 1/06 248/481 |
| 2002/0027728 A1 | | 3/2002 | Lang et al. | |
| 2006/0061895 A1 | | 3/2006 | Lang et al. | |
| 2008/0259476 A1 | * | 10/2008 | Branham | .................. B60R 1/06 359/871 |

FOREIGN PATENT DOCUMENTS

| | | |
|---|---|---|
| CN | 1347821 A | 5/2002 |
| CN | 1751912 A | 3/2006 |
| CN | 103889783 A | 6/2014 |
| EP | 0276677 A1 | 8/1988 |
| JP | H0826032 A | 1/1996 |
| WO | 2010045989 A1 | 4/2010 |
| WO | 2013036987 A1 | 3/2013 |

* cited by examiner

*Primary Examiner* — Jennifer D. Carruth
(74) *Attorney, Agent, or Firm* — Volpe and Koenig P.C.

(57) ABSTRACT

An exterior mirror unit for a motor vehicle includes a mirror part and a carrier which carries the mirror part. The mirror part is detachably fixed to the carrier via a coupling. A method is also provided for detaching a mirror part of an exterior mirror unit for a motor vehicle from a carrier of the exterior mirror unit in which a coupling between the mirror part and the carrier is adjusted from the lock position to the release position.

12 Claims, 4 Drawing Sheets

EXTERIOR MIRROR UNIT

The invention relates to an external mirror unit for a motor vehicle, comprising a mirror part and a carrier which carries the mirror part.

Motor vehicles are generally provided with one or more exterior mirror units to improve the driver's view of what is happening around him. These exterior mirrors include inter alia a mirror part, usually having a reflective surface, and a carrier which carries the mirror part.

This carrier may, for instance, be substantially flat, in particular plate-shaped or ring-shaped, but it is also conceivable that the carrier is shell-shaped, and forms a casing which surrounds an inner space of the exterior mirror. In such inner space, for instance, other components of the exterior mirror may be accommodated, for instance adjusting instruments or signal lights.

Generally, the mirror part and the carrying part are permanently connected with each other, being, for example, glued together. This can be disadvantageous if the mirror part needs to be replaced, for instance when the reflective surface is of glass, and is broken. In that case, often, in addition to the mirror part, the carrier needs to be replaced as well, and hence often even the entire exterior mirror unit. This is economically unfavorable.

The object of the invention is to counteract the disadvantage mentioned. To this end, the invention provides an exterior mirror unit for a motor vehicle, comprising a mirror part and a carrier which carries the mirror part, wherein the mirror part is fixed to the carrier detachably via a coupling.

By connecting the mirror part with the carrier detachably via a coupling, the advantage can be achieved that the mirror part can be detached from the carrier, and can be replaced as a discrete entity.

The invention also relates to a method for detaching a mirror part of an exterior mirror unit of a motor vehicle, from a carrier of an exterior mirror.

Further advantageous embodiments of the invention are set forth in the subclaims.

The invention will be further elucidated on the basis of exemplary embodiments which are represented in the drawing. In the drawing.

It is noted that the figures are merely schematic representations of non-limiting preferred embodiments of the invention.

Figure 1:
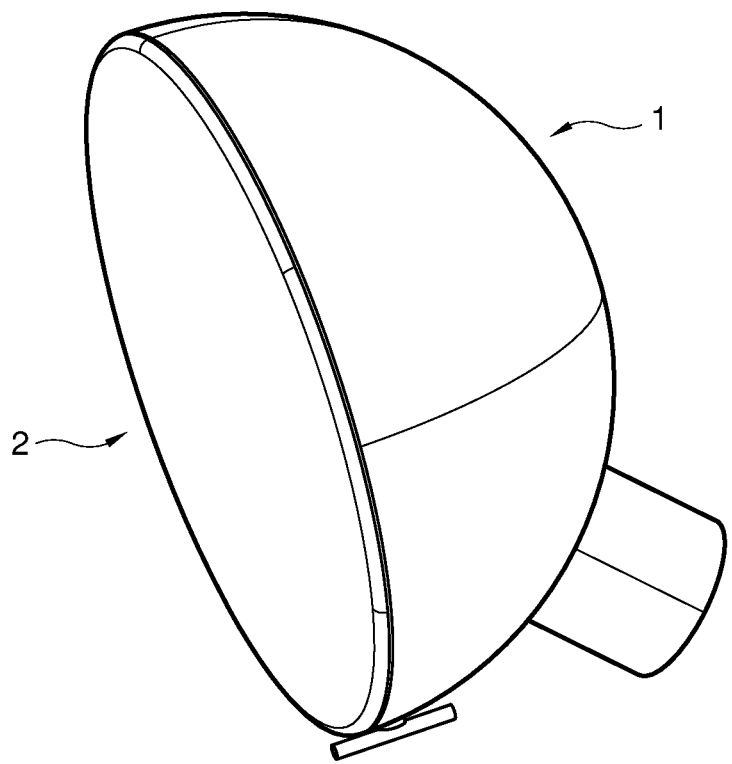
FIG. 1 shows a schematic perspective view of an exemplary embodiment of an exterior mirror unit according to an aspect of the invention.

FIG. 1 shows a perspective view of an exterior mirror unit 1 for a motor vehicle (not shown), comprising a mirror part 2 and a carrier 3 which carries the mirror part 2, the mirror part 2 being detachably fixed to the carrier 3 via a coupling 4. The mirror part 2 usually comprises, for instance, a mirror, or can be a different part that is provided with a reflective surface.

Figure 2:
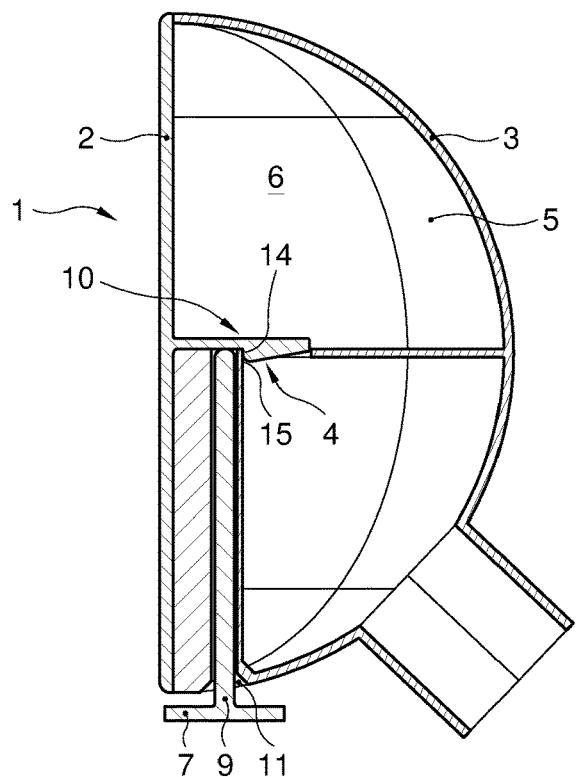
FIG. 2 shows a schematic cross section of the exterior mirror unit of FIG. 1, with a detachable operating element extending through the casing, and a coupling between mirror part and mirror carrier in a lock position.

FIG. 2 shows a schematic cross section of the exterior mirror unit 1 in which it is shown that the carrier 3 forms a casing 5 or a mirror housing 5. The casing 5 or the mirror housing 5 surrounds an inner space 6 of the exterior mirror unit 1. The coupling 4 is here enclosed by the casing 5 and/or by the mirror part 2. The carrier 2 is adjustable, for instance rotatable, relative to the fixed world, that is, adjustable relative to a body of the motor vehicle, so that, for instance, a user can bring the carrier 3 into a desired position. In order to adjust the carrier 3, the inner space 6 can comprise an adjustment drive (not shown) for driven adjustment relative to the fixed world of the carrier 3 with the mirror part 2 fixed thereon.

Figure 3:
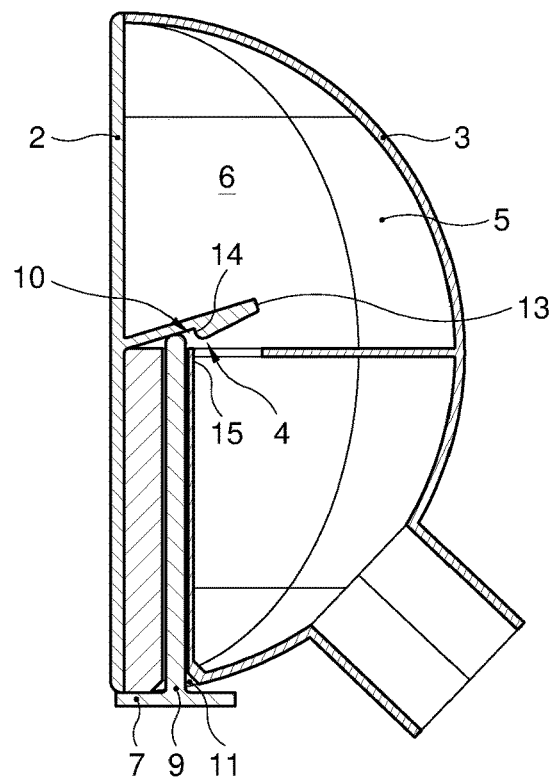
FIG. 3 shows a schematic cross section of the exterior mirror unit of FIG. 1, with the coupling brought into a detach position with the aid of the operating element.

As shown in FIG. 2 and FIG. 3, the coupling 4 in embodiments is adjustable between a lock position in which the mirror part 2 and carrier 3 are fixed to each other, and a release position in which the mirror part 2 can be detached from the carrier 3. The exterior mirror unit 1 is provided with an operating element 7 with which the coupling 4 is adjustable from the lock position to the release position or vice versa. The mirror part 2 can comprise a snap finger 13 which is provided with a stop surface 14 which abuts against a stop 15 of the carrier 3 so as to fix the mirror part 2 to the carrier 3. In FIG. 2 it is shown that the stop surface 14 lies against the stop 15. In FIG. 3 it is shown that the snap finger 13 has been cleared by means of the operating element 7, so that the stop surface 14 of the snap finger 13 does not abut against the stop 15 of the carrier 3 anymore, as a result of which the mirror part 2 and the carrier 3 are clear of each other, that is, the mirror part 2 then is not fixed to the carrier 3 anymore.

It will be clear to those skilled in the art that the snap finger 13 may be provided on a side of the mirror part 2 that faces towards the carrier 3 and/or towards the inner space 6. The snap finger 13 may hence be provided on a rear side of the mirror part 2. The mirroring or reflective surface may then be provided on an opposite side, such as a front side, of the mirror part 2.

Further, it will be clear to those skilled in the art that the snap finger 13 may be provided alternatively on the carrier 3 and that a stop 15 cooperating therewith may then be provided on the mirror part 2.

Furthermore, it will be clear to those skilled in the art that the snap finger 13 may be biased so as to have the stop surface 14 of the snap finger 13 engage behind the stop 15.

Figure 5:
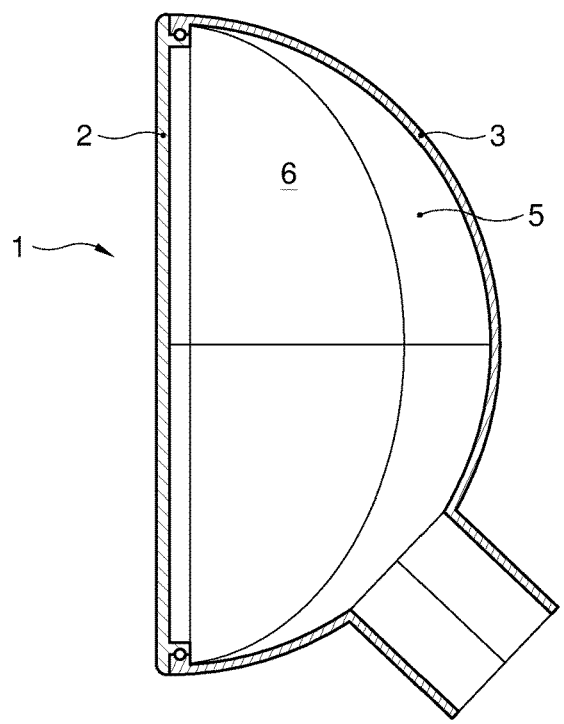
FIG. 5 shows a schematic cross section of an alternative embodiment of the exterior mirror unit according to an aspect of the invention, where the operating element is implemented as a flexible wire or a flexible cord.
Figure 6:
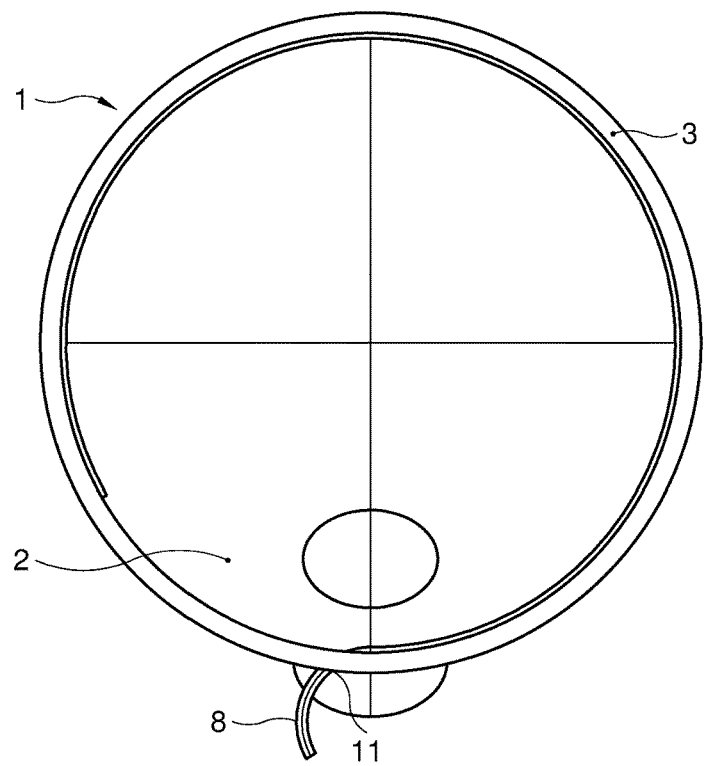
FIG. 6 is a cutaway front view of the exterior mirror unit of FIG. 5 during (un)coupling, with the operating element extending through an opening in the casing.

In FIG. 5 and FIG. 6 it is shown that the operating element 7 may be flexible, and in particular can comprise a flexible cord 8 or flexible wire 8. The cord 8 or the wire 8 is, for example, substantially non-elastic so that it is difficultly compressible. The operating element 7 is here, for instance, detachable. By detachment of the operating element 7, the coupling 4 is adjustable from the lock position to the release position thus allowing the mirror part 2 to be fixed or detached.

The operating element 7 can be or comprise, in particular, an operating pin 9. In the embodiment of FIGS. 2 and 3, the operating element 7 is stiff, that is, the operating element 7, at any rate an operating pin 9 thereof, is substantially not compressible in its length direction.

As shown, for example, in FIG. 3, the operating element 7 may be addable, that is, during normal use of the mirror unit 1, the operating element 7 does not need to be provided in or on the carrier 3 and/or the mirror part 2. By addition of the operating element 7, the coupling 4 can be adjustable from the lock position to the release position.

The coupling 4 can comprise a snap connection 10 for fixing the mirror part 2 on the carrier 3.

It will be clear to those skilled in the art that the snap connection 10 may be formed, for example, by a snap finger 13 provided with a stop surface 14, and a stop 15 cooperating therewith.

Figure 4:
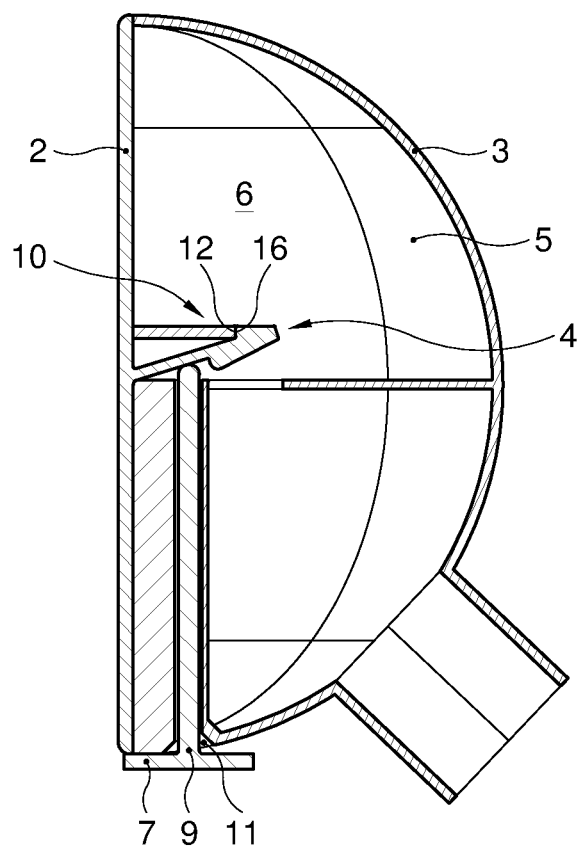
FIG. 4 shows a schematic cross section of an alternative embodiment of the exterior mirror unit of FIGS. 1-3, in which an operating stop is provided.

FIG. 4 shows a schematic cross section of an alternative embodiment, which can constitute a further elaboration of the embodiment of FIGS. 2 and 3. In the embodiment of FIG. 4, the exterior mirror unit 1 is configured to counteract the mirror part 2 being simple to detach from the carrier 3 when not an operating element 7 with an operating pin 9 of a predetermined length is used, but when someone unauthorizedly wants to remove the mirror part 2 using a different pin which is inserted through a recess 11 or opening 11. To this end, the exterior mirror unit 1 is provided with an operating stop 12. It will be clear that the operating stop 12 may be provided in or on the carrier 3 if the snap finger 13 is provided on or to the mirror part 2. The operating stop 12 is then configured to engage a second stop surface 16 of the mirror part 2 to fix the mirror part 2 to the carrier 3. It will be clear that the second stop surface 16 of the mirror part 2 may be provided on the snap finger 13.

Alternatively, the operating stop 12, and the stop 15 cooperating in the lock position with the first stop surface 14, may both be provided on or to the mirror part 2, while the snap finger 13 with the two stop surfaces 14, 16 can then be provided in or on the carrier 3.

The operation of the exterior mirror unit 1 of FIG. 4 is as follows. The mirror part 2 can be snapped onto the carrier 3 whereby the first stop surface 14 of the snap finger 13 snaps behind the stop 15 of the carrier 3. It will be clear that the operating element 7 with the operating pin 9 does not need to be present during such snapping-on, at least, does not need to be inserted in the opening 11 or recess 11. To detach the mirror part 2 at a later time, for instance to replace a damaged specimen with a new specimen, an operating pin 9 of an operating element 7 can be added by inserting it via the opening 11 or recess 11 to unlock the snap finger 13.

When the operating pin 9 is not inserted far enough, for instance resulting from the use of a too short, non-original operating pin, the snap finger 13 will not be pushed clear. When, as can be seen in FIG. 4, too long an operating pin is used, it will usually be inserted farther, as a result of which the first stop surface 14 of the snap finger 13 gets uncoupled from the stop 15 of the carrier 3, but the second stop surface 16 will engage behind the operating stop 12, as a result of which the mirror part 2 still cannot be detached from the carrier 3, thus preventing unauthorized detachment of the mirror part 2 with the aid of a too long, non-fitting, non-associated and/or non-original operating pin.

While the operating pin shown in FIG. 4 is hence basically too long, the operating pin 9 fitting or belonging to the exterior mirror unit 1 may preferably, just as shown in FIG. 4, be provided with an element projecting in a lateral direction from the operating pin 9, such as a further stop, which can prevent the operating pin 9 being inserted too far. This is to say that the laterally projecting element of the operating element 7 can prevent the operating pin 9 being unintentionally inserted so far that the second stop surface 16 unintendedly engages behind the operating stop 12 of the mirror part 2. It will be clear to those skilled in the art that the length of the operating pin 9, measured from the laterally projecting element of the operating element 7, most preferably is not only so long as to prevent the operating pin 9 from being unintentionally inserted too far, but also so long that when the laterally projecting element of the operating element 7 butts against the mirror carrier 3 and/or the mirror part 2, the snap finger 13 has meanwhile been pushed away so far that the first stop surface 14 no longer engages behind the stop 15 of the carrier 3.

Most preferably, the exterior mirror unit 1 is configured such that there is only little clearance between the normal lock position, in which the first stop surface 14 of the snap finger 13 engages behind the stop 15, and a position as shown in FIG. 4, in which the second stop surface 16 of the snap finger 13 engages the operating stop 12. For instance, the exterior mirror unit 1 is configured such that at the moment when the first stop surface 14 of the snap finger 13 and the stop 15 come clear of each other, the second stop surface 16 of the snap finger 13 is removed less than 8 or 5 mm, preferably less than 3 or 2 mm, or even less than 1 mm, from the operating stop 12. A person wanting to detach the mirror part 2 from the carrier 3 unauthorizedly is thus given only little freedom of movement, for if he inserts a too long operating pin only a little bit too far, as can be seen, for instance, in FIG. 4, the second stop surface 16 of the snap finger 13 will already engage the operating stop 12, and the mirror part 2 is fixed again. At the moment when this person proceeds to retract the too long operating pin a bit again, he will quickly retract the too long operating pin so far again that the first stop surface 14 of the snap finger 13 engages behind the stop 15 again and he still cannot unauthorizedly detach the mirror part 2.

Also in the alternative exemplary embodiment of FIGS. 5 and 6, the mirror carrier 3 and/or the mirror part 2, and in particular a casing 5 formed by the mirror carrier 3, is provided with an opening 11 for passing therethrough an operating element 7 of the coupling 4. For instance, it is possible to pass the cord 8 through the opening 11 whereby an end of the cord comes to lie near a second opening (not shown). Thus, the cord 8 is elegantly incorporated in the exterior mirror unit 1. To be able to take out the cord 8, a body, such as a pin element, can be inserted through the first or second opening so that the other end of the cord protrudes from the first or second opening. It will be clear to those skilled in the art that this can be advantageous, because this can facilitate removal of the cord 8 to detach the mirror part 2 from the mirror carrier 3, while during normal use the cord 8 does not need to protrude from the insert opening 11 and thus unauthorized detachment of the mirror part 2 from the mirror carrier 3 can be counteracted.

The invention also concerns a method for detaching a mirror part 2 from a carrier 3 of an exterior mirror unit 1 for a motor vehicle (not shown), whereby a coupling 4 between mirror part 2 and carrier 3 is adjusted from the lock position to the release position. The coupling 4 is preferably adjusted by detachment or addition of an operating element 7 via a recess 11 in a casing 5 of the exterior mirror unit.

As has been discussed hereinabove in light of the exemplary embodiments of FIGS. 2-4, the mirror part 2 may, prior to detachment, be fixed on the mirror carrier 3 with the aid of a snap connection 10.

It is noted that the invention is not limited to the exemplary embodiments described here, and that many variants are possible within the scope of the invention as set forth in the appended claims.

The invention claimed is:

1. An exterior mirror unit for a motor vehicle, comprising a mirror part and a carrier configured to carry the mirror part, wherein the carrier forms a casing which surrounds an inner space of the exterior mirror unit, the inner space is located between a rear of the mirror part and the carrier, the mirror part is detachably fixed to the carrier via a coupling, and the coupling comprises a snap connection configured to fix the mirror part with the carrier, wherein the snap connection comprises:

a snap finger including a first stop surface, a stop configured to cooperate with the first stop surface, wherein the snap finger is associated with the mirror part and the stop is associated with the carrier, or the snap finger associated with the carrier and the stop is associated with the mirror part, and a second stop surface configured to cooperate with an operating stop, which, depending on the positioning of the snap finger, is associated with the carrier or the mirror part.

2. The exterior mirror unit according to claim 1, wherein the coupling is enclosed by at least one of the casing or the mirror part.

3. The exterior mirror unit according to claim 1, wherein the carrier is adjustable relative to the motor vehicle.

4. The exterior mirror unit according to claim 1, wherein the inner space comprises an adjustment drive for driven adjustment of the carrier relative to the motor vehicle.

5. The exterior mirror unit according to claim 1, wherein the coupling is adjustable between a lock position in which mirror part and carrier are fixed to each other, and a release position in which the mirror part can be detached from the carrier.

6. The exterior mirror unit according to claim 5, further comprising an operating element configured to adjust the coupling from the lock position to the release position or vice versa.

7. The exterior mirror unit according to claim 6, wherein the operating element is stiff and comprises an operating pin.

8. The exterior mirror unit according claim 6, wherein the operating element is addable, and wherein through addition of the operating element the coupling is adjustable from the lock position to the release position.

9. The exterior mirror unit according to claim 6, wherein at least one of the mirror part, the carrier, or a casing formed by the carrier is provided with a recess or an opening for passing therethrough the operating element.

10. The exterior mirror unit according to claim 1, wherein the operating element comprises a projecting element forming a third stop, wherein the projecting element allows the operating element to be inserted so far that the snap finger can be pushed away from the stop, but wherein said projecting element prevents the operating element from being inserted so far that the second stop surface engages the operating stop.

11. The exterior mirror unit according claim 10, wherein the operating element is addable, and wherein through addition of the operating element the coupling is adjustable from the lock position to the release position.

12. A method for detaching a mirror part of an exterior mirror unit for a motor vehicle from a carrier of the exterior mirror unit, the method comprising:

inserting an operating element through a recess or an opening in at least one of the mirror part, the carrier, or the casing formed by the carrier, wherein the carrier forms a casing which surrounds an inner space of the exterior mirror unit, and the inner space is located between a rear of the mirror part and the carrier;

adjusting a coupling between the mirror part and the carrier from a lock position to a release position, wherein the mirror part is detachably fixed to the carrier via the coupling, the mirror part, prior to detachment is fixed on the mirror carrier with the aid of a snap connection, and the coupling between the mirror part and the carrier comprises the snap connection; and uncoupling the snap connection of the coupling with the aid of the operating element being inserted through the recess or the opening, wherein the operating element comprises an operating pin and a projecting element that projects in a lateral direction from the operating pin such that the projecting element abuts against at least one of the carrier or the mirror part and is configured to act as a stop in the release position, and the operating pin keeps the snap finger of the snap connection in the release position.

\* \* \* \* \*